UNITED STATES PATENT OFFICE.

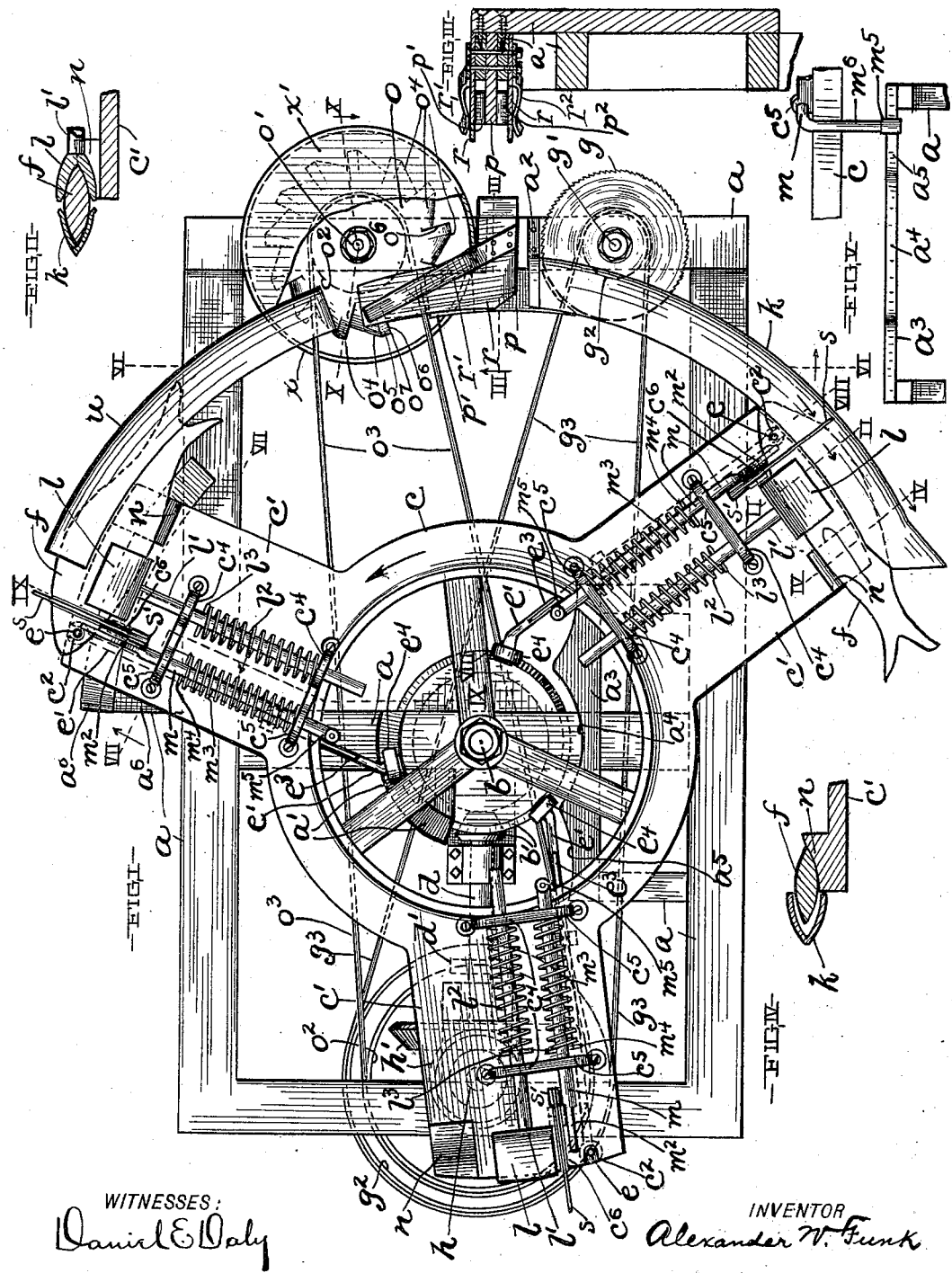

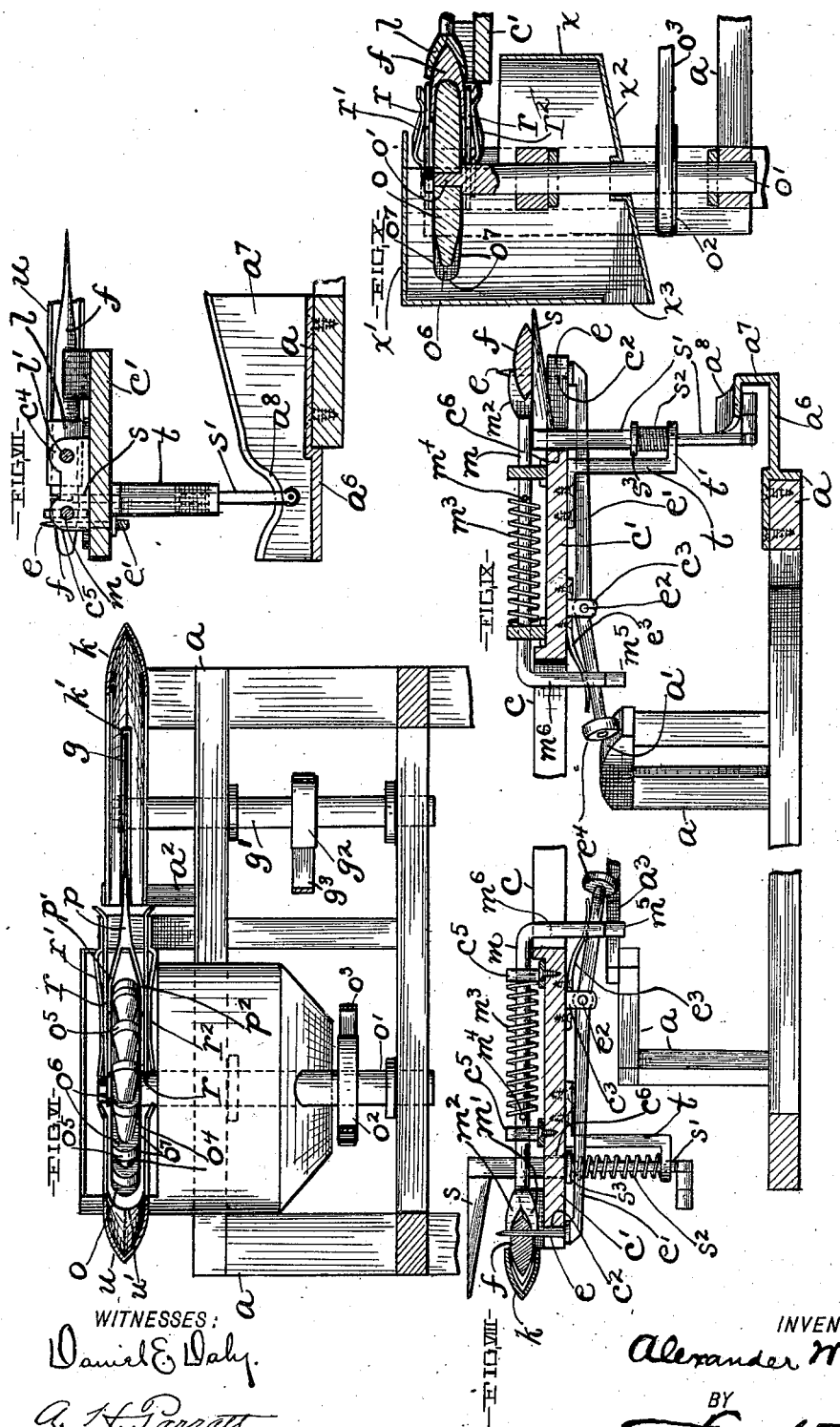

ALEXANDER W. FUNK, OF CLEVELAND, OHIO, ASSIGNOR OF THREE-FOURTHS TO ROBERT C. BENDER AND TO THE BUCKEYE FISH COMPANY, OF CLEVELAND, OHIO, A CORPORATION OF OHIO.

FISH-DRESSING MACHINE.

SPECIFICATION forming part of Letters Patent No. 687,010, dated November 19, 1901.

Application filed April 8, 1901. Serial No. 54,928. (No model.)

*To all whom it may concern:*

Be it known that I, ALEXANDER W. FUNK, a resident of Cleveland, in the county of Cuyahoga and State of Ohio, have invented certain new and useful Improvements in Fish-Dressing Machines; and I do hereby declare the following to be a full, clear, and exact description of the invention, such as will enable others skilled in the art to which it pertains to make and use the same.

My invention relates to improvements in fish-dressing machines; and the invention pertains more especially to a machine capable of opening the belly of the fish centrally and longitudinally, removing the entrails and cleaning the fish internally and beheading the cleaned fish.

The object of this invention is to provide a machine of the character indicated which will dress fish with great facility and which is simple and durable in construction and reliable and convenient in its operation.

With this object in view the invention consists in certain features of construction and combinations of parts hereinafter described, and pointed out in the claims.

In the accompanying drawings, Figure I is a top plan of a machine or apparatus embodying my invention, and portions are broken away in this figure to more clearly show the construction. Fig. II is a vertical section on line II II, Fig. I, looking in the direction indicated by the arrow. Fig. III is a vertical section in detail on line III III, Fig. I, looking rearwardly. Fig. IV is a vertical section on line IV IV, Fig. I, looking in the direction indicated by the arrow. Fig. V is an elevation illustrating the rear side of the bar $a^3$ and shows the sloping surface $a^5$, formed upon the said side, engaged by the roller $m^5$ of one of the bars $m$. Fig. VI is a vertical section on line VI VI, Fig. I, looking in the direction indicated by the arrow. Fig. VII is a vertical section on line VII VII, Fig. I, looking in the direction indicated by the arrow. Fig. VIII is a vertical section on line VIII VIII, Fig. I, looking in the direction indicated by the arrow. Fig. IX is a section on the somewhat irregular line IX IX, Fig. I, looking in the direction indicated by the arrow and illustrating the operation of the mechanism instrumental in the withdrawal of a fish-attaching pin $e$ of the fish-carrier. Fig. X is a section on line X X, Fig. I, looking forwardly, except that in Fig. X a fish $f$ is shown being operated upon and of course engaged by the jaw $l$ of one of the arms $c'$ of the fish-carrier.

Referring to the drawings, $a$ designates the stationary supporting-framework of the machine, and $b$ represents a vertically-arranged suitably-driven shaft which is supported from the framework in any approved manner. A rotary fish-carrier for receiving the fish to be operated upon and carrying the same during the operations thereon is arranged in a horizontal plane and operatively connected in any approved manner with the shaft $b$. The said fish-carrier comprises, preferably, a wheel $c$, operatively mounted upon the upper end of the shaft $b$ and having several outwardly-projecting horizontally-arranged arms $c'$, which are arranged radially and spaced equidistant circumferentially of the wheel $c$. The shaft $b$ is rotated in the direction required to cause the fish-carrier to rotate in the direction indicated by the arrow, Fig. I, and is intergeared, as at $b'$, with the driving-shaft $d$, which is arranged at the left-hand side of and at right angles to the shaft $b$ and supported from the framework $a$ in any approved manner. The shaft $d$ has a driving-wheel $d'$, (only shown in dotted lines, Fig. I,) to which power is applied in any approved manner.

Each arm $c'$ of the fish-carrier receives the fish that is to be placed thereon preparatory to the operations upon the said fish at the forward side of the machine, where the attendant who supplies the machine with fish to be operated upon stands, and I would here remark that a fish to be operated upon is laid upon the outer end of each arm $c'$, when the said arm during the operation of the machine comes into position at the forward side of the machine, and the fish thus placed upon the said arm is laid on its side along the outer or circumferential edge of the arm with its head pointing in the direction in which the fish-carrier is rotated and with its belly facing outwardly. In the drawings, $f$ designates a fish being operated upon. Each fish which is delivered to the machine is attached to the respective arm $c'$ by an upwardly-projecting upright pin $e$, which is arranged to project through the said arm $c'$ into the head of the fish. Each arm $c'$ is provided, therefore, with a pin $e$, which engages and is adapted to operate within a hole or recess $c^2$, formed in and extending vertically through the said arm $c'$, as shown more clearly in Fig. VIII. The pin $e$ of each arm $c'$ is carried by the outer end of a vertically-tiltable bar $e'$, which extends from the said pin toward the axis of the fish-carrier and is arranged below and supported from the fish-carrier in any approved manner, being pivoted horizontally, as at $e^2$, to a hanger $c^3$, rigid with and depending from the said carrier. A suitably-applied spring $e^3$ is interposed between the under side of the fish-carrier and the bar $e'$ between the axis and inner end of the said bar, which spring is attached to the said carrier and acts to retain the said bar tilted in the direction required to hold the pin $e$, connected with the bar, elevated, and the said pin $e$ is long enough to project, when elevated, above the respective fish-carrying arm $c'$ the distance required to enable the said pin in its elevated position to project upwardly through or into the head of the fish placed upon the said arm, and thereby removably attach the fish at its head to the fish-carrier. The spring $e^3$ of each fish-carrying arm $c'$ acts, therefore, to retain the fish-engaging pin $e$ of the said arm in its elevated position. The inner end of the bar $e'$ of each arm $c'$ (see Figs. I and IX) is provided with a roller $e^4$, and an incline $a'$, formed upon the stationary framework of the machine below the fish-carrier, is arranged rearwardly and circumferentially of the shaft $b$ and slopes upwardly in the direction in which the fish-carrier is rotated and has such arrangement relative to the inner and roller-bearing end of the bars $e'$ of the fish-carrying arms $c'$ that the roller-bearing end of each bar $e'$ shall during the revolution of the said bar during the operation of the machine engage and ride upon the said incline and by the latter be tilted in the direction required to effect a lowering of the upwardly-projecting pin $e$ of the bar below the upper surface of the fish-carrier, and consequently out of engagement with the engaging fish.

The operation of opening the belly of the fish and cleaning the same internally takes place during the interval of time between the attachment of the fish to be operated upon to a pin $e$ of the fish-carrier and the disengagement of the said pin from the fish. In the machine illustrated, therefore, the apparatus for opening the fish and removing the entrails is arranged at the right-hand side of the machine, and the device for opening the belly of the fish comprises a rotary peripherically-serrated cutter $g$, (see Fig. I,) operatively mounted in any approved manner upon a vertically-arranged shaft $g'$, which is suitably supported from the framework $a$ and is operatively connected by pulleys $g^2$ and belting $g^3$ with another vertically-arranged shaft $h$, located at the left-hand side of the machine and suitably supported from the framework $a$, and the last-mentioned shaft is intergeared, as at $h'$, with the driving-shaft $d$, and consequently the cutter-shaft $g'$ is operatively connected with the driving-shaft. I have found that a rotary peripherically-serrated cutter is especially suitable for opening fish preparatory to the subsequent internal cleaning of the fish. The cutter is located, of course, forward of the means employed to remove the entrails from the fish and extends into the path of the fish the distance required to render it capable of entering the head and belly of the fish a suitable distance. The cutter is arranged above the upper surface of the fish-carrier in position to open the belly of the fish operated upon by the cutter centrally and longitudinally.

Obviously it is important to suitably guide and prevent displacement of the fish preparatory to and during the operation of the cutter $g$. A guide $k$ extends from the rear side of the cutter $g$ forwardly and circumferentially of the sweep of the fish-carrier. The guide $k$ is arranged to engage the belly of the fish preparatory to and during the operation of the cutter $g$ and is secured at its rear end in any approved manner (see Figs. I and VI) to an arm or bracket $a^2$, rigid with the framework $a$. The guide $k$ in cross-section or end elevation has the shape required to render it capable of embracing the belly of the fish, as shown in Figs. II, IV, and VIII. The rear portion of the guide $k$ is slotted laterally, as at $k'$, (see Fig. VI,) to accommodate the location and operation of the cutter $g$. Obviously the guide $k$ is instrumental also in supporting the fish preparatory to and during the operation of the cutter $g$ and prevents displacement of the fish vertically.

Each arm $c'$ of the fish-carrier is provided with means adapted to yieldingly press the fish-carrier by the said arm outwardly, and consequently the fish upon the said arm is pressed against the inner side of the guide $k$ preparatory to and during the operation of the cutter $g$. The said pressure-exerting means comprises, preferably, a yielding jaw $l$, (see Figs. I and II,) having the dimensions and shape required to render it capable of embracing the back of the fish next to or near the head of the fish. The jaw $l$ of each fish-carrying arm $c'$ has a stem $l'$, which extends from the jaw toward the axis of the fish-carrier and has bearing in two boxes $c^4$ and $c^4$, rigid with the said arm a suitable distance apart longitudinally of the stem. A spiral spring $l^2$ is mounted and confined upon the said stem $l'$ between the inner box $c^4$ and a pin or shoulder $l^3$, with which the said stem is provided between the two boxes $c^4$ and $c^4$ and a suitable distance from the outer box $c^4$. The said spring $l^2$ acts to retain the connected jaw $l$ in its outer extreme position. The guide $k$ has such arrangement relative to the path of the pressure-exerting jaws $l$ of the fish-carrier that the jaw $l$ of each arm $c'$ of the said carrier shall during the travel of the said jaw adjacent to and along the guide $k$ press the fish upon the said arm $c'$ against the said guide $k$. Obviously the members $l$ prevent displacement of the fish engaged thereby inwardly or toward the axis of the fish-carrier. The lower portion of each jaw $l$ slightly elevates the fish engaged by the said jaw above the upper surface of the fish-carrier, as desired, for conveniently accommodating the various operations upon the fish.

To hold the body of the fish which is to be operated upon in line horizontally from end to end preparatory to and during the operation of the cutter $g$ to enable the latter to open the fish centrally from end to end of the body of the fish, each arm $c'$ of the fish-carrier is provided upon its upper side with a forked bar $m$, arranged with its forked end in position to straddle the head of the fish at the back of the fish and hold the forward end of the fish in the position required to enable the cutter $g$ to properly commence its operation upon the fish at the head or forward end of the fish, centrally between the sides of the fish—that is, the lower member $m'$ of the forked end of the bar $m$ (see Fig. VIII) affords a seat for the forward end of the fish and holds the head of the fish straight in line with the body of the fish, and the upper member $m^2$ of the forked end of the bar $m$ prevents upward displacement of the head of the fish during the operation of the machine. Each bar $m$ extends from its forked end toward the axis of the fish-carrier and has bearing in two boxes $c^5$ and $c^5$, arranged a suitable distance apart longitudinally of the bar and rigid with the fish-carrier, and a spiral spring $m^3$ is mounted and confined upon the said bar between the inner box $c^5$ and a pin or shoulder $m^4$, with which the bar is provided between the two boxes $c^5$ and $c^5$ and a suitable distance from the outer box $c^5$. The said spring $m^3$ acts to retain the bar in its extreme outer or fish-engageable position. The jaw $l$ of each arm $c'$ of the fish-carrier is arranged centrally between the bar $m$ of the said arm and a slightly-elevated seat $n$ for the rear end of the body of the fish carried by the said arms, (see Figs. I and IV,) which seat $n$ is formed by the inwardly and upwardly sloping top of a lug formed upon the said arm $c'$.

To accommodate a convenient attachment of the fish to the pin $e$ of an arm $c'$ of the fish-carrier, means for actuating the bar $m$ of the said arm inwardly far enough away from the said pin $e$ is provided, and comprises, preferably, (see Figs. I and V,) a horizontally-arranged guide-bar $a^3$ rigid with the framework $a$ and arranged below the fish-carrier and forward of the shaft $b$. The bar $a^3$ has its central portion provided with a surface $a^4$, arranged concentrically of the shaft $b$ and terminating at its left-hand end in a surface $a^5$, which extends to the left and outwardly from the said end of the aforesaid surface $a^4$ and is arranged in the path of a roller $m^5$, with which an arm $m^6$, formed upon and depending from the inner end of each bar $m$, is provided. The engagement of the roller $m^5$ of the arm $m^6$ of a bar $m$ with the surface $a^5$ of the bar $a^3$ is shown in Fig. V.

Improved apparatus for spreading apart the sides of the fish, which has been opened, as hereinbefore described, and thereupon removing the entrails from the fish and cleaning and scraping the opened portion of the fish internally is located at the rear of the cutter $g$ and comprises (see Figs. I, VI, and X) a wheel $o$ operatively mounted upon the upper end of a vertically-arranged shaft $o'$, which is supported from the framework $a$ in any approved manner and is operatively connected, by means of pulleys $o^2$ and belt $o^3$, with the shaft $h$. The wheel $o$ is provided upon its periphery with projections $o^4$, having their sweep extending into the path of the opened portion of the fish, and consequently arranged to enter the fish during the operation of the said wheel and remove the entrails from and effectually scrape and clean the fish internally.

The device $p$ (see Figs. I, III, and VI) for spreading apart the sides of a fish opened by the cutter $g$ is arranged between the cutter and the fish-cleaning wheel $o$ in the line of the opened portion of the fish and extends from a point next adjacent and in close proximity to the serrated periphery of the cutter $g$ rearwardly and circumferentially of the fish-carrier toward the said wheel $o$. The upper side and lower side of the spreading device diverge, as shown in Fig. VI, from the forward extremity of the said device rearwardly, so that the said device is capable of gradually spreading apart the sides of the opened portion of the fish, and the spreading device at its rear end has two arms $p'$ and $p^2$, overlapping the upper side and lower side, respectively, of the sweep of the fish-cleaning projections $o^4$ of the wheel $o$, as shown in Fig. VI. Two yielding pressure-exerting sheet-metal plates $r$ and $r$ (see Figs. I, III, VI, and X) are arranged, respectively, above and below the spreading device $p$ and extend longitudinally of the spreading device circumferentially of the fish-carrier and beyond the rear end of the spreading device and overlap the top and bottom, respectively, of the outer or fish-cleaning portion of the wheel $o$. A strong flat spring $r'$ engages the upper side of the upper pressure-exerting plate $r'$, and another strong flat spring $r^2$ engages the lower side of the lower pressure-exerting plate $r$. The springs $r'$ and $r^2$, the pressure-exerting plates $r$ and $r$, and the spreading device are secured to the stationary framework $a$ in any approved manner. Obviously the opened portion of a fish that is being cleaned internally by the wheel $o$ embraces the spreading device and has its sides spread apart by the said spreading device to accommodate and facilitate an effective operation of the wheel $o$ upon the interior of the fish. The projections $o^4$ of the wheel $o$ to render them capable of nicely cleaning the walls of the chamber formed within the opened fish are rounded at their outer extremity, as at $o^5$, and each projection has a radially-arranged face $o^6$, forming a continuous cutting edge $o^7$, extending radially of the wheel at the top of the said face to and along the rounded extremity $o^5$ of the projection and radially of the wheel at the bottom of the said face. The pressure-exerting members $r$ and $r$ vertically confine the fish being operated upon by the wheel and are somewhat pressed apart during the operation of the wheel $o$ against the action of the springs $r'$ and $r^2$, and obviously the fish being cleaned is vigorously acted upon during the operation of the said wheel without injury to the meat of the fish.

To prevent scattering of the entrails or other material removed from the interior of the fish during the cleaning of the fish by the wheel $o$, a hood $x'$, which covers and incloses the outer portion of the said wheel, (see Figs. I and X,) is provided and formed preferably upon the upper end of a hopper or receptacle $x$, which is arranged below the said wheel in position to catch the said material. The receptacle $x$ is provided with an inclined bottom $x^2$ and a discharge-opening $x^3$ at the lower end of the said bottom, as shown in Fig. X.

Each arm $c'$ of the fish-carrier is provided also with a knife $s$ for beheading the fish, and the said knife $s$ is formed upon the upper end of a vertically-movable bar $s'$, which extends (see Figs. I and IX) through a slot $c^6$, formed in and radially of the said arm. In the normal position of the parts the knife-bar is elevated above the path of the fish carried by the said arm, as shown in Fig. VIII. The knife projects outwardly from the arm and is arranged radially of the fish-carrier, and the knife has its lower and cutting edge arranged at an angle to the knife-bar, so as to render the knife capable of making a shear cut. The slot $c^6$ extends to the peripheral edge of the arm $c'$ and is of course wide enough to accommodate the location and operation of the knife-bar and connected knife.

The knife $s$ of each fish-carrying arm $c'$ is arranged between the head-centering bar $m$ and the fish-engaging jaw $l$ of the said arm, and obviously the said knife upon actuating the same downwardly far enough severs the head from the body of the fish. The knife-bar $s'$ of each fish-carrying arm $c'$ extends below the said arm a suitable distance (see Fig. IX) and extends through and has bearing in a laterally-projecting ear $t'$, formed upon a bracket or hanger $t$, rigid with and depending from the said arm, and a spiral spring $s^2$, mounted and confined upon the said knife-bar between the said ear $t'$ and an external shoulder $s^3$, formed upon the said bar $s'$ a suitable distance above the ear, acts to retain the said bar and cutting-knife in their normal and elevated position. Means for operating each knife $s$ after the fish which is next to be beheaded by the said knife has been cleaned by the wheel $o$ is therefore provided and (see Figs. I and IX) consists, preferably, of a plate or bar $a^6$, which is removably secured, by means of screws $a^9$, to the stationary framework $a$ of the machine, which bar or plate $a^6$ is provided with an upright arm $a^7$, having at its upper end a flange $a^8$, extending circumferentially of the axis of the fish-carrier, and the under side of the said flange $a^8$ is arranged in the path of the roller $s^4$, with which the lower end of each knife-bar $s'$ is provided, and has such trend that each knife $s$ once during each rotation of the fish-carrier is operated against the action of the spring, which acts to retain the said knife in its elevated position. The plate or bar $a^6$ is of course located rearwardly of or beyond the fish-cleaning wheel $o$, as shown in Fig. I, and consequently the fish-beheading operation does not take place until after a fish which is to be beheaded has been cleaned internally.

A guide $u$, which substantially corresponds in construction to the construction of the guide $k$, is instrumental in guiding the fish during the travel of the fish from the wheel $o$ to the place where the beheading operation takes place. The guide $u$ is instrumental in preventing displacement of the fish preparatory to and during the fish-beheading operation. The guide $u$ extends from the rear side of the wheel $o$ rearwardly and circumferentially of the sweep of the fish-carrier and is arranged to be engaged by the belly of the fish and is supported in any approved manner from the framework $a$. The guide $u$ in cross-section or end elevation has the shape required to render it capable of embracing the belly of the fish, as shown in Fig. VI, and the forward portion of the said guide is slotted laterally, as at $u'$, (see Fig. VI,) to accommodate the location and operation of the fish-cleaning wheel $o$. Obviously the guide $u$ is instrumental also in supporting the fish during the interval of time between the cleaning operation and the beheading operation.

Obviously the fish-attaching pin $e$ of each fish-carrying arm $c'$ should be withdrawn from the fish next after the beheading operation to accommodate the discharge of the beheaded fish from the fish-carrier, and consequently the arrangement of parts or members of the said mechanism is such that the said pin shall be rendered inoperative not before, but immediately after, the operation of the fish-beheading knife of the said arm $c'$.

What I claim is—

1. A fish-dressing machine comprising a rotary fish-carrier arranged to operate in a horizontal plane, means for operating the carrier, means for attaching the fish to the carrier near the circumferential edge of the carrier, a rotary cutter arranged outside of the sweep of the carrier in position to open the fish longitudinally, means for operating the cutter, a stationary guide extending forwardly from the cutter and arranged circumferentially of the sweep of the fish-carrier in the position required to render it capable of guiding the fish during the passage of the fish to the cutter, and means upon the carrier for engaging the fish and pressing the fish against the aforesaid guide preparatory to and during the operation of the cutter.

2. A fish-dressing machine comprising a rotary fish-carrier arranged to operate in a horizontal plane, means for operating the carrier, means for attaching the fish to the carrier near the circumferential edge of the carrier, a rotary cutter arranged outside of the sweep of the carrier in position to open the fish longitudinally, means for operating the cutter, a stationary guide $k$ arranged circumferentially of the sweep of the fish-carrier and extending from the cutter forwardly and shaped as required to embrace the belly of the fish preparatory to and during the operation of the cutter, and means upon the carrier for engaging the back of the fish and holding the fish against the aforesaid guide preparatory to and during the operation of the cutter.

3. A fish-dressing machine comprising a rotary fish-carrier arranged to operate in a horizontal plane, means for operating the carrier, means for attaching the fish to the carrier near the circumferential edge of the carrier, a cutter arranged outside of the sweep of the carrier in position to open the fish longitudinally, means for operating the cutter, a guide extending forwardly from the cutter and arranged circumferentially of the sweep of the carrier in the position required to be engaged by the adjacent portion of the fish preparatory to and during the operation of the carrier, and a yielding clamping-jaw located on the carrier and arranged to engage the fish opposite the aforesaid guide during the operation of the carrier.

4. A fish-dressing machine comprising a rotary fish-carrier, means for operating the carrier, means for attaching the fish to the carrier near the circumferential edge of the carrier, a cutter arranged outside of the sweep of the carrier in position to open the fish longitudinally, means for operating the cutter, a guide extending forwardly from the cutter and arranged circumferentially of the sweep of the carrier in the position required to engage the adjacent portion of the fish preparatory to and during the operation of the cutter, a yieldable clamping-jaw located on the carrier and arranged to engage the fish opposite the aforesaid guide during the operation of the carrier, and means acting to retain the said jaw in its operative position.

5. A fish-dressing machine comprising a rotary fish-carrier arranged to operate in a horizontal plane, means for operating the carrier, means for attaching the fish to the carrier near the circumferential edge of the carrier, a rotary cutter arranged outside of the sweep of the carrier in position to open the fish longitudinally, means for operating the cutter, a stationary guide arranged circumferentially of the sweep of the carrier and extending from the cutter forwardly and shaped as required to embrace the adjacent portion of the fish preparatory to and during the operation of the cutter, a yielding clamping-jaw located on the carrier and arranged to embrace the fish opposite the aforesaid guide, and a suitably-applied spring arranged to hold the said clamping-jaw in its operative position.

6. A fish-dressing machine comprising a rotary fish-carrier, means for operating the carrier, means for attaching the fish to the carrier near the circumferential edge of the carrier, fish-opening means arranged outside of the sweep of the carrier, a stationary guide extending forwardly from the fish-opening means and arranged circumferentially of the sweep of the carrier in the position required to engage the adjacent portion of the fish preparatory to and during the operation of the fish-opening means, a laterally-movable clamping-jaw located on the carrier and arranged to engage the fish opposite the aforesaid guide during the operation of the carrier, which jaw is provided with a stem extending toward the axis of the carrier, means affording bearing for the stem and borne by the carrier, and means acting to retain the said jaw in its outer and operative position.

7. A fish-dressing machine comprising a rotary fish-carrier arranged to operate in a horizontal plane, means for operating the carrier, means for attaching the fish to the carrier near the circumferential edge of the carrier, fish-opening means arranged outside of the sweep of the carrier, a stationary guide arranged circumferentially of the sweep of the carrier and extending from the fish-opening means forwardly and shaped as required to embrace the adjacent portion of the fish preparatory to and during the operation of the fish-opening means, a laterally-moving clamping-jaw located on the carrier and arranged to engage the fish opposite the aforesaid guide during the operation of the carrier, which jaw is provided with a stem extending toward the axis of the fish-carrier, means affording bearing for the stem and borne by the carrier, and means acting to retain the aforesaid jaw in its outer and operative position.

8. A fish-dressing machine comprising a rotary fish-carrier arranged to operate in a horizontal plane, means for operating the carrier, means for attaching the fish to the carrier near the circumferential edge of the carrier, fish-opening means arranged outside of the sweep of the carrier, a stationary guide arranged outside and circumferentially of the sweep of the carrier and extending forwardly from the fish-opening means and shaped as required to render it capable of embracing the adjacent portion of the fish preparatory to and during the operation of the fish-opening means, a jaw located on the carrier and arranged to engage the fish opposite the aforesaid guide during the operation of the carrier, which jaw is provided with a stem extending toward the axis of the fish-carrier, two boxes affording bearing for the stem and rigid with the carrier, and a spiral spring confined upon the said stem between the inner box and the shoulder on the stem and acting to retain the fish-pressing jaw in its extreme outer position.

9. A fish-dressing machine comprising a rotary fish-carrier arranged to operate in a horizontal plane, means for operating the carrier, means for attaching the fish to the carrier near the circumferential edge of the carrier, fish-dressing apparatus arranged outside of the sweep of the carrier, a stationary guide arranged circumferentially of the sweep of the carrier and extending forwardly from the said apparatus, a jaw located on the carrier and arranged to press the fish against the aforesaid guide during the operation of the carrier, two seats at opposite ends, respectively, of the said jaw for holding the head and rear end of the body of the fish in line, one of the said seats being rigid with the carrier, and the other seat being movable toward and from the axis of the carrier, and means acting to retain the last-mentioned seat in its extreme outer and operative position.

10. A fish-dressing machine comprising a rotary fish-carrier arranged to operate in a horizontal plane, means for operating the carrier, means for attaching the fish to the carrier near the circumferential edge of the carrier, fish-opening means arranged outside of the sweep of the carrier, a stationary guide arranged circumferentially of the sweep of the carrier and extending forwardly from the fish-opening means, a yielding jaw borne by the carrier and arranged to press the fish which is to be operated upon against the inner side of the aforesaid guide during the actuation of the carrier, two seats located on the carrier at opposite ends, respectively, of the said jaw for holding the head and rear end of the body of the fish in line, one of the said seats being rigid with the carrier, and the other seat being movable toward and from the axis of the carrier, means acting to retain the last-mentioned seat in its extreme outer and operative position, and means for shifting the said last-mentioned seat inwardly and thereby rendering it inoperative and arranged to operate preparatory to the actuation of the fish alongside of the aforesaid guide.

11. A fish-dressing machine comprising a rotary fish-carrier arranged to operate in a horizontal plane; means for operating the carrier; means for attaching the fish to the carrier near the circumferential edge of the carrier; fish-opening means arranged outside of the sweep of the carrier; a stationary guide arranged outside and circumferentially of the sweep of the carrier and extending forwardly from the fish-opening means; a yielding jaw borne by the carrier and arranged to press the fish, which is to be operated upon, against the inner side of the aforesaid guide during the actuation of the carrier, a seat arranged upon the carrier at one end of the said jaw and in position to somewhat elevate the rear end of the body of the fish; a fork arranged upon the carrier at the opposite end of the aforesaid jaw in position to embrace and somewhat elevate the head of the fish, which fork is movable toward and from the axis of the fish-carrier; means acting to retain the said fork in its extreme outer position, and means for actuating the said fork inwardly and thereby rendering it inoperative, which last-mentioned fork-operating means is arranged to operate preparatory to the actuation of the fish alongside of the aforesaid guide.

12. A fish-dressing machine comprising a rotary fish-carrier, means for operating the carrier, means for attaching the fish to the carrier near the circumferential edge of the carrier, fish-opening means arranged outside of the sweep of the carrier, a guide arranged outside of the carrier and circumferentially of the said sweep and extending forwardly from the fish-opening means, means borne by the carrier and adapted to press the fish to be operated upon against the inner side of the aforesaid guide during the actuation of the carrier, a forked bar carried by the carrier and having its fork arranged to embrace the head of the fish, a spiral spring mounted and confined upon the said bar and acting to retain the bar in its outer and operative position, and stationary means arranged to operate upon the said bar and actuate the latter inwardly during the operation of the carrier preparatory to the action of the fish alongside the aforesaid guide, substantially as and for the purpose set forth.

13. A fish-dressing machine comprising a rotary fish-carrier arranged to operate in a horizontal plane; means for operating the carrier; means for attaching the fish to the carrier near the circumferential edge of the carrier; fish-opening means arranged outside of the sweep of the carrier; a stationary guide $k$ arranged outside and circumferentially of the sweep of the carrier and extending forwardly from the fish-opening means; means located on the carrier and adapted to yieldingly press the body of the fish against the inner side of the aforesaid guide during the actuation of the carrier; an endwise-shiftable bar $m$ borne by the carrier and provided at one end with a fork arranged to embrace the head of the fish and extending toward the axis of the carrier and provided at its inner end with a depending roller-bearing arm; means acting to retain the said bar in its extreme outer position, and means arranged in the path of the roller of the arm of the bar and adapted to actuate the bar inwardly and render it inoperative, and the arrangement of the parts being such that the said bar shall be rendered inoperative preparatory to the actuation of the fish alongside of the aforesaid guide.

14. A fish-dressing machine comprising a rotary fish-carrier arranged to operate in a horizontal plane; means for operating the carrier; means for attaching the fish to the carrier near the circumferential edge of the carrier; fish-opening means arranged outside of the sweep of the carrier; a stationary guide $k$ arranged outside and circumferentially of the sweep of the carrier and extending forwardly from the fish-opening means; means located upon the carrier and adapted to yieldingly press the body of the fish which is to be operated upon against the inner side of the aforesaid guide during the actuation of the carrier; an endwise-shiftable bar $m$ borne by the carrier and provided at one end with a fork arranged to embrace the head of the fish and extending toward the axis of the carrier and provided, at its inner end, with a depending arm $m^6$ having a roller $m^5$; means acting to retain the said bar in its extreme outer position, and the stationary bar $a^3$ arranged below the carrier forwardly of the axis of the carrier and provided with a surface $a^4$ extending concentrically of the said axis, and a surface $a^5$ extending outwardly from the said concentrically-arranged surface and arranged in the path of the aforesaid roller, and the arrangement of parts being such that the aforesaid shiftable bar shall be actuated inwardly by the said surface $a^5$ so as to render the said bar inoperative preparatory to the actuation of the fish alongside of the aforesaid guide $k$.

15. A fish-dressing machine comprising a rotary fish-carrier arranged to operate in a horizontal plane; means for operating the carrier; fish-opening means arranged outside of the sweep of the carrier; a wheel having members arranged to enter the opened fish and clean or dress the fish internally; means for operating the said wheel; means for spreading apart the sides of the opened fish preparatory to and during the operation of the said wheel; two yielding plates arranged, respectively, above and below the path of the fish at the top and bottom, respectively, of the path of the fish-entering members of the aforesaid wheel, and springs engaging and bearing against the outer sides of the said plates.

16. A fish-dressing machine comprising a rotary fish-carrier, means for operating the carrier, fish-opening means arranged to operate upon the fish during the operation of the carrier, a scraping-wheel arranged to enter the opened fish and clean or dress the fish internally, a hood extending over the said wheel and preventing scattering of the entrails removed from the fish, and a receptacle arranged below the said wheel and below the hood for receiving the material removed from the fish.

17. A fish-dressing machine comprising a rotary fish-carrier, means for operating the carrier; fish-opening means arranged to operate upon the fish during the actuation of the carrier, means for cleaning or dressing the fish internally and arranged to operate upon the fish when the latter is opened, and means for beheading the fish subsequent to the internal cleaning or dressing of the fish.

18. A fish-dressing machine comprising a rotary fish-carrier, means for operating the carrier, fish-opening means arranged to operate upon the fish during the actuation of the carrier, means for cleaning or dressing the fish internally and arranged to operate upon the fish when the latter is opened, a vertically-movable knife arranged to behead the fish during the descent of the knife, means acting to retain the knife in its elevated position, and means for lowering the knife and arranged to operate subsequent to the cleaning or dressing of the fish internally.

19. A fish-dressing machine comprising a fish-carrier, means for operating the carrier, fish-opening means arranged to operate upon the fish during the actuation of the carrier, means for cleaning or dressing the fish internally and arranged to operate upon the fish when the latter is opened, a vertically-movable knife having its cutting edge at the bottom and arranged at an angle to the path of the knife and arranged to behead the fish during the descent of the knife, means acting to retain the knife in its elevated position, and means for lowering the knife and arranged to operate subsequent to the cleaning or dressing of the fish internally.

20. A fish-dressing machine comprising a fish-carrier, means for operating the carrier, fish-opening means arranged to operate upon the fish during the actuation of the carrier, means for cleaning or dressing the fish internally and arranged to operate upon the fish when the latter is opened, a knife arranged to behead the fish during the descent of the knife, a bar rigid with the knife and movable up and down and borne by the fish-carrier, means acting to retain the knife-bar in its elevated position, means for lowering the knife-bar and comprising a roller carried by the lower end of the knife-bar, and a stationary member arranged in the path of the said roller and having such trend that the said roller, upon its engagement with the said stationary member during the operation of the fish-carrier, shall be lowered and thereby result in the operation of the knife, and the arrangement of parts being such that the knife shall operate subsequent to the dressing or cleaning of the fish internally.

21. A fish-dressing machine comprising a fish-carrier, means for actuating the carrier, means for attaching the fish which is to be operated upon to the carrier, a fish-beheading knife arranged to operate during its descent, a knife-bar rigid with the knife and movable up and down and borne by the carrier, means acting to retain the knife-bar in its elevated position, and means for lowering the said bar at a predetermined time and thereby operating the knife.

22. A fish-dressing machine comprising a fish-carrier, means for actuating the carrier, means for attaching the fish which is to be operated upon to the carrier, a fish-beheading knife arranged to operate during its descent, a bar rigid with the knife and extending downwardly through the carrier and movable up and down, a spiral spring mounted and confined upon the bar below the carrier and acting to retain the bar in its elevated position, and means for lowering the bar and thereby operating the knife.

23. A fish-dressing machine comprising a rotary fish-carrier, means for operating the carrier, fish-opening means arranged to operate upon the fish during the actuation of the carrier, means for cleaning or dressing the fish internally and arranged to operate upon the fish when the latter is opened, a fish-beheading knife arranged above and radially of the carrier in position to operate during the descent of the knife, means acting to retain the knife in its elevated position, mechanism for lowering and thereby operating the knife after the cleaning or dressing of the fish internally, and means for guiding and preventing displacement of the fish during the travel of the fish from the fish-cleaning means to the place where the beheading operation takes place.

24. A fish-dressing machine comprising a fish-carrier, means for operating the carrier, an upwardly-projecting pin $e$ borne by the carrier and movable up and down, which pin projects above the carrier in its elevated position, means acting to retain the pin in its elevated position, and means for lowering the pin, substantially as and for the purpose set forth.

25. A fish-dressing machine comprising a fish-carrier, means for operating the carrier, an upwardly-projecting pin $e$ movable up and down and projecting above the carrier in its elevated position, means acting to retain the pin in its elevated position, a suitably-tiltable lever supported from the carrier and connected with the lower end of the aforesaid pin, and means for tilting the lever in the direction required to lower the pin against the action of the means acting to retain the pin in its elevated position.

26. A fish-dressing machine comprising a fish-carrier, means for operating the carrier, an upwardly-projecting pin $e$ movable up and down and projecting above the carrier in its elevated position, means acting to retain the said pin in its elevated position, a vertically-tiltable lever supported from the carrier and connected with the lower end of the aforesaid pin, which lever has one end thereof connected with the lower end of the aforesaid pin and has its opposite end provided with a roller, and a stationary incline arranged in the path of the said roller and having such trend that the travel of the roller in engagement with the incline shall result in the descent of the aforesaid pin.

27. A fish-dressing machine comprising a rotary fish-carrier; means for operating the carrier; means for attaching the fish which is to be operated upon to the carrier near the outer or circumferential edge of the carrier, which fish-attaching means comprises an upwardly-projecting pin $e$ borne by the carrier and movable up and down and projecting above the carrier in its elevated position; means acting to retain the said pin in its elevated position; mechanism for lowering the said pin and thereby rendering it inoperative; a cutter arranged outside of the sweep of the carrier in position to longitudinally slit or open the fish; means for preventing displacement of the fish preparatory to and during the operation of the cutter; means for scraping and cleaning the fish internally and arranged a suitable distance from the cutter in the direction in which the fish-carrier is rotated, and the spreading device arranged circumferentially of the sweep of the carrier between the cutter and the fish-scraping and fish-cleaning means, and the arrangement of parts being such that the aforesaid fish-attaching pin shall be rendered operative preparatory to the cutting operation, and rendered inoperative after the fish-scraping and fish-cleaning operation.

28. A fish-dressing machine comprising a rotary fish-carrier; means for operating the carrier; means for attaching the fish which is to be operated upon to the carrier near the outer circumferential edge of the carrier, which fish-attaching means comprises an upwardly-projecting pin borne by the carrier and movable up and down and projecting above the carrier in its elevated position; means acting to retain the said pin in its elevated position; mechanism for lowering the said pin and rendering it inoperative; a cutter arranged outside of the sweep of the carrier in position to longitudinally slit or open the fish; means for preventing displacement of the fish preparatory to and during the operation of the cutter; means for scraping and cleaning the fish internally and arranged a suitable distance from the cutter in the direction in which the fish-carrier is rotated; the spreading device arranged circumferentially of the sweep of the carrier between the cutter and the fish-scraping and fish-cleaning means; a fish-beheading knife borne by the carrier and movable up and down and arranged above the carrier in its elevated position; means acting to retain the knife in its elevated position; means for lowering the knife, which knife-lowering means is arranged to operate after the fish-scraping and fish-cleaning operation, and means for guiding and preventing displacement of the fish during its travel from the fish-cleaning and fish-scraping means to the place at which the fish-beheading operation occurs, and the arrangement of parts being such that the aforesaid fish-attaching pin shall be rendered operative preparatory to the cutting operation and shall be rendered inoperative after the fish-beheading operation.

Signed by me at Cleveland, Ohio, this 26th day of March, 1901.

ALEXANDER W. FUNK.

Witnesses:
C. H. DORER,
A. H. PARRATT.